(12) United States Patent
Kirsten

(10) Patent No.: US 7,147,742 B2
(45) Date of Patent: Dec. 12, 2006

(54) METHOD FOR ACCELERATING THE CURING OF ADHESIVES

(75) Inventor: Christian Kirsten, Burscheid (DE)

(73) Assignee: Henkel Kommanditgesellschaft auf Aktien ( Henkel KGAA), Duesseldorf (DE)

( * ) Notice: Subject to any disclaimer, the term of this patent is extended or adjusted under 35 U.S.C. 154(b) by 36 days.

(21) Appl. No.: 10/343,297

(22) PCT Filed: Jul. 25, 2001

(86) PCT No.: PCT/EP01/08600

§ 371 (c)(1),
(2), (4) Date: Jan. 29, 2003

(87) PCT Pub. No.: WO02/12409

PCT Pub. Date: Feb. 14, 2002

(65) Prior Publication Data

US 2003/0168640 A1     Sep. 11, 2003

(30) Foreign Application Priority Data

Aug. 3, 2000 (DE) ................................. 100 37 884

(51) Int. Cl.
*B32B 37/06* (2006.01)
(52) U.S. Cl. ................ 156/272.2; 156/272.4; 156/273.3; 156/273.5; 156/275.5; 156/275.7
(58) Field of Classification Search ............. 156/272.2, 156/272.4, 273.3, 273.5, 275.5, 275.7; 219/634, 219/759
See application file for complete search history.

(56) References Cited

U.S. PATENT DOCUMENTS

| | | | |
|---|---|---|---|
| 3,564,515 A | 2/1971 | Gratien | |
| 3,620,875 A | 11/1971 | Guglielmo, Sr. et al. | |
| 4,083,901 A | 4/1978 | Schonfeld et al. | |
| 4,176,054 A | 11/1979 | Kelley | |
| 4,254,201 A | 3/1981 | Sawai et al. | |
| 4,548,862 A | 10/1985 | Hartman | |
| 4,635,415 A | 1/1987 | Schumacher et al. | |
| 4,810,799 A | 3/1989 | Zanker et al. | |
| 4,849,262 A | 7/1989 | Uhl et al. | |
| 4,882,399 A | 11/1989 | Tesoro et al. | |
| 5,064,494 A | 11/1991 | Duck et al. | |
| 5,143,987 A | 9/1992 | Hansel et al. | |
| 5,185,422 A | 2/1993 | Drouve et al. | |
| 5,189,078 A * | 2/1993 | Johnson et al. ............. 523/137 |
| 5,240,626 A | 8/1993 | Thakur et al. | |
| 5,338,611 A | 8/1994 | Lause et al. | |
| 5,391,595 A | 2/1995 | Clark et al. | |
| 5,574,123 A | 11/1996 | Bock et al. | |
| 5,620,794 A | 4/1997 | Burkart et al. | |
| 5,695,901 A | 12/1997 | Selim | |
| 5,710,215 A | 1/1998 | Abend | |
| 5,714,238 A | 2/1998 | Komagata et al. | |
| 5,786,030 A | 7/1998 | Ahmed et al. | |
| 5,800,866 A | 9/1998 | Myers et al. | |
| 5,820,664 A | 10/1998 | Gardiner et al. | |
| 5,833,795 A | 11/1998 | Smith et al. | |
| 5,846,426 A | 12/1998 | Boos et al. | |
| 5,910,522 A * | 6/1999 | Schmidt et al. ............. 523/168 |
| 5,925,455 A | 7/1999 | Bruzzone et al. | |
| 5,985,435 A | 11/1999 | Czaplicki et al. | |
| 5,994,422 A | 11/1999 | Born et al. | |
| 6,004,425 A | 12/1999 | Born et al. | |
| 6,011,307 A | 1/2000 | Jiang et al. | |
| 6,183,658 B1 | 2/2001 | Lesniak et al. | |
| 6,245,177 B1 | 6/2001 | Luehmann | |
| 6,348,548 B1 | 2/2002 | Abend | |
| 6,448,338 B1 | 9/2002 | Born et al. | |
| 6,472,475 B1 | 10/2002 | Lanoye et al. | |
| 6,591,125 B1 | 7/2003 | Buse et al. | |
| 6,592,745 B1 | 7/2003 | Feldman et al. | |
| 6,602,989 B1 | 8/2003 | Sadik et al. | |
| 6,605,200 B1 | 8/2003 | Mao et al. | |
| 6,610,269 B1 | 8/2003 | Klaveness et al. | |
| 6,613,713 B1 | 9/2003 | Becke et al. | |
| 6,613,794 B1 | 9/2003 | Hoefgen et al. | |
| 6,632,899 B1 | 10/2003 | Kol et al. | |
| 2003/0168640 A1 | 9/2003 | Kirsten | |

FOREIGN PATENT DOCUMENTS

| | | |
|---|---|---|
| DE | 158973 | 2/1983 |
| DE | 35 01 490 | 7/1986 |
| DE | 37 09 852 | 10/1988 |
| DE | 41 30 268 | 3/1992 |
| DE | 42 30 116 | 10/1995 |
| DE | 195 02 381 A1 | 8/1996 |
| DE | 195 12 427 | 10/1996 |

(Continued)

OTHER PUBLICATIONS

R. V. Decahau et al., "Microwave Processing and Engineering", VCH, Verlagsgesellschaft, pp. 34-44 (1986).

(Continued)

*Primary Examiner*—Richard Crispino
*Assistant Examiner*—Christopher Schatz
(74) *Attorney, Agent, or Firm*—Woodcock Washburn LLP

(57) ABSTRACT

A process for heating particle filled adhesive compositions by using an electrical, magnetic or electromagnetic alternating field. Nanoscale particles are employed having ferromagnetic, ferrimagnetic, superparamagnetic or piezoelectric properties. These particles more efficiently convert the electrical, magnetic or electromagnetic input into heat to cure the adhesive composition. With this process not only is the rate of cure accelerated but the various properties of the adhesive are less likely to be adversely affected.

15 Claims, No Drawings

FOREIGN PATENT DOCUMENTS

| | | |
|---|---|---|
| DE | 195 18 673 A1 | 11/1996 |
| DE | 195 26 351 | 1/1997 |
| DE | 196 49 893 | 6/1997 |
| DE | 196 14 136 A1 | 10/1997 |
| DE | 197 26 282 A1 | 12/1998 |
| DE | 197 30 425 A1 | 1/1999 |
| DE | 198 32 629 | 2/2000 |
| DE | 199 54 960 | 6/2000 |
| DE | 199 04 835 | 8/2000 |
| DE | 199 24 138 | 11/2000 |
| EP | 0 131 903 A2 | 1/1985 |
| EP | 0 212 511 A1 | 3/1987 |
| EP | 0 237 657 A1 | 9/1987 |
| EP | 0 356 715 A1 | 3/1990 |
| EP | 0 417 540 A2 | 8/1990 |
| EP | 0 510 476 A1 | 10/1992 |
| EP | 0 545 033 A2 | 6/1993 |
| EP | 0 671 423 A1 | 9/1995 |
| EP | 0 521 825 | 8/1996 |
| EP | 0 922 720 A1 | 12/1997 |
| EP | 0 735 121 | 5/2001 |
| EP | 0 598 873 B1 | 9/2002 |
| GB | 1087815 | 10/1967 |
| WO | WO 87/01724 | 3/1987 |
| WO | WO 88/09712 A1 | 12/1988 |
| WO | WO 94/12582 | 6/1994 |
| WO | WO 98/05726 A1 | 2/1998 |
| WO | WO 98/05728 A1 | 2/1998 |
| WO | WO 98/51476 A1 | 11/1998 |
| WO | WO 99/03306 A1 | 1/1999 |
| WO | WO 99/07774 | 2/1999 |
| WO | WO 200034404 A1 * | 6/2000 |

OTHER PUBLICATIONS

G. Habenicht, "Kleben: Grundlagen, Technologie, Anwendungen", 3rd Edition, Chapter 2.3.4.4 (1997).

Kirk-Othmer, "Encyclopedia of Chemical Technology", 3rd Edition, vol. 15, Chapter: Microwave Technology, pp. 494-522.

Sastri et al., "Reversible Crosslinking in Expoxy Resins," Journal of Applied Polymer Science, vol. 39, pp. 1439-1457, John Wiley & Sons, Inc. (1990).

Testing of adhesives for metals and adhesively bonded metal joints; Determination of the sheer strength of single lap joints in shear by tension loading, (DIN 53 283), pp. 1-5, Deutsches Institut fuer Normung e.V., Berlin, (Sep. 1979).

J. Ray Ballinger, "Paramagnetism", Paramagnetic Material (1994-1996) at http://www.mritutor.org/mritutor/paragmag.htm.

J. Ray Ballinger, "Ferromagnetism", Ferromagnetic Material (1994-1996) at http://www.mritutor.org/mritutor/ferromag.htm.

Raymond A. Serway, "Hysteresis", Physics for Scientiest and Engineers with modern Physics. Third Edition, Saunderts Golden Sunburst Series, pp. 852-862m 1882 (Abstract only, 2 pages) at http://www.ece.uic.edu/~kcha/hysteresis.htm.

Jon Dobson, "Magnetism in Matter and Magnetic Biomaterials", Centre for Science and Technology in Medicine, Keele University, Jan. 2000 at http://www.keele.ac.uk./depts/stm/magmaterials.html.

Jeff P. Anderson, et al., "Permeability and Hysteresis Measurement", 2000 CRC Press LLC, at http://www.engnetbase.com.

Wikipedia, The Free Encyclopedia, "Ferromagnetism", at http://www.en2.wikipedia.org/wiki/Ferromagnetism.

Wikipedia, The Free Encyclopedia, "Paramagnetism", at http://www.en2.wikipedia.org/wiki/Paramagnetism.

Wikipedia, The Free Encyclopedia, "Superparamagnetism", at http://www.en2.wikipedia.org/wiki/Superparamagnetis.

Kryszewski, et al. Nanostructured conducting polymer composites-supermagnetic Particles in conducting polymers, *Synth. Met*, 94, pp. 99-104, XP000934280 (1998).

* cited by examiner

METHOD FOR ACCELERATING THE CURING OF ADHESIVES

CROSS REFERENCE TO RELATED APPLICATIONS

This application is a national stage application under 35 USC 371 of international application PCT/EP01108600 filed on Jul. 25, 2001, the international application not being published in English. This application also claims priority under 35 USC 119 to DE 100 37 884.6, filed on Aug. 3, 2000.

BACKGROUND OF THE INVENTION

This invention relates to a process for heating particle-filled adhesive compositions with the aid of an electrical, magnetic or electromagnetic alternating field. The present invention also relates to a process for bonding metallic and nonmetallic materials by heating particle-filled adhesive compositions with the aid of the alternating fields mentioned above.

In many branches of industry, particularly in the metal-processing industry, for example the motor industry, in the manufacture of utility vehicles and the associated supplier industries or even in the production of machines and domestic appliances and in the building industry, identical or different, metallic and nonmetallic substrates are being increasingly joined together by adhesives or sealants. This method of joining structural components is increasingly replacing conventional joining techniques, such as riveting, screwing or welding, because bonding/sealing offers a number of technological advantages. This is particularly the case in the joining of materials differing in composition, as in the joining of metals to plastics and/or composites or even in the joining of different metals, for example steel parts to parts of aluminium or magnesium.

One requirement which modern production processes in the industrial sector, more particularly in car manufacture, are expected to satisfy is that the various joined parts should lend themselves to rapid subsequent processing. A basic disadvantage of reactive adhesive systems is that a relatively long period of time is required for the curing of the adhesives and hence for the buildup of strength. Although this basic disadvantage is not so pronounced in the case of hotmelt adhesives, non-reactive (non-postcrosslinking) hotmelt adhesives can only be exposed to high temperatures over a limited range, particularly where high-strength adhesive bonds are involved. With reactive adhesives, the curing process is normally accelerated to a very considerable extent by heating so that strength is built up very quickly. To this end, the entire workpiece already provided with adhesive and joined is normally heated. This can be done in various ways, for example in large ovens, by hot air blowers, by direct exposure of the workpieces or those areas of the workpieces which are to be bonded to flames or by exposure to IR heaters. Heat-sensitive workpieces cannot be treated in this way so that there is a need to provide a process in which only the adhesive itself is heated. Such selective heating of the adhesive is known in principle. Thus, WO 99/09712 describes a process for the at least partial curing of sealants and adhesives, particularly in the direct glazing of motor vehicles, by exposing at least part of the sealant and adhesive to microwave energy.

The use of microwave energy for heating electrically nonconductive materials is known per se. A comprehensive account of this technology can be found in R. V. Decahau and R. A. Peterson's "Microwave Processing and Engineering", VCH Verlagsgesellschaft, 1986.

The use of microwaves for curing polyurethane systems such as occur in adhesive compositions is also known in principle (U.S. Pat. No. 4,083,901). In these known processes for utilizing microwave energy, however, the substrates to be heated are always exposed to the microwave field in large closed chambers, such as for example large ovens or belt dryers. Unfortunately, such processes cannot be applied where bonds and seals are to be formed on large and difficult items, such as for example car parts or entire care bodies, and only very small areas in relation to the overall size of the part are to be exposed to microwave energy.

The amount of microwave energy to be supplied for the partial or complete curing process depends on various factors, for example the viscosity of the sealant and adhesive used and the thickness of the layer to be cured, the amount supplied being greater, the higher the viscosity of the sealant and adhesive and the smaller the layer thickness.

To solve these problems, WO 88/09712 proposes applying the microwave energy in pulses using specially designed emitters, a first group of pulses in which the pulse amplitudes decrease being delivered. This pulse-like application of the microwave energy initially delivers a relatively large but brief supply of energy so that part of the sealant and adhesive is heated to a considerable extent without any sign of burning or decomposition. Between the delivery of the first microwave pulse and the delivery of the following pulse of a second group, temperature equalization occurs in the sealant and adhesive through thermal conduction so that the following pulse does not cause any overheating of the, initially, relatively intensively heated part of the sealant and adhesive. By virtue of the heating effect of the first pulse and the resulting increase in the temperature of the sealant and adhesive, a smaller amount of energy is then delivered because the sealant and adhesive can now be exposed to microwave pulses of decreasing amplitude. In practice, however, this process has shown that controlling the amount of energy is difficult and is limited where extremely short cycle times are available for the joining process and hence for curing.

EP-A 545 033 describes a process for joining an electrical winding to an iron core, more particularly of ignition coils, using an adhesive curable by heat. In this process, the windings and core are exposed to a high-frequency alternating field so that they are heated. In this way, the unit formed by the winding and core is rapidly and uniformly heated so that the adhesive is cured. However, this process can only be applied to the structural aspects of special electrical components.

EP-A-237 657 describes a method for joining a strip of carpet. To this end, the adhesive layer is said to contain a high-frequency induction powder or an adhesive tape is said to contain an electrically conductive metal foil. It is proposed to introduce powder-form iron, cobalt, nickel, aluminium, carbon or graphite as conductive or inductive materials into a heat-sensitive material. These powder-form particles preferably have a flat lamellar structure in order to accelerate heating by induction heating.

U.S. Pat. No. 5,833,795 describes a method for repairing composite materials by bonding a repair patch to the product consisting of a composite material. It is proposed to use an epoxy adhesive containing magnetic particles so that the adhesive or the epoxy resin can be cured by electromagnetic excitation of the magnetic particles. More specifically, microwave curing is proposed. To this end, the magnetic particles, such as iron silicide, should be present in quantities of about 15 to 20% by volume and the magnetic particles should have a Curie temperature in the temperature range necessary for curing.

WO 98/05726 describes a process for adhesively joining rubber components. In this process, the surfaces of the rubber parts to be joined are placed beside a special device. This device contains a target element which absorbs electromagnetic waves and which is in contact with a heat-activatable adhesive. The electromagnetic waves heat the target element to active the adhesive. The surfaces to be joined are held together and the device is exposed to electromagnetic radiation so that sufficient heat is produced to activate the adhesive and establish a bond between the rubber parts and the working surface. A very similar device is described in WO 98/05728. According to this document, the device in question is particularly efficient when used between components that are transparent to electromagnetic waves.

WO 98/51476 describes a process for forming a system for carrying liquids and, more particularly, a process for joining a rigid thermoplastic vessel to a flexible thermoplastic or thermoset, elastomeric line which is produced using an electromagnetic joining technique. The flexible line is designed in such a way that it guarantees an exact fit onto the rigid vessel under compressive forces. To this end, an electromagnetically setting adhesive is applied between the components before the electromagnetic forces are applied. The adhesive material is said to be a thermoplastic material which contains at least 60% by weight of uniformly distributed particles absorbing electromagnetic energy.

Accordingly, although it is known from the prior art that the adhesive can be exposed to electromagnetic radiation in two ways: first, devices or substrates adjacent the adhesive layer are heated by electromagnetic radiation and, second, particles absorbing electromagnetic radiation are added to the adhesive and have to be dispersed in very high percentages into the adhesive matrix, such high percentages of metal powders or other particles absorbing electromagnetic radiation often have a very adverse effect on the strength of the adhesive thus cured, particularly in the case of high-strength adhesives.

Against the background of this prior art, the problem addressed by the present invention was to provide processes which could convert the electromagnetic radiation more effectively into the heat required for heating the adhesive and which would not adversely affect the properties of the adhesive.

SUMMARY OF THE INVENTION

The solution to this problem as provided by the invention is defined in the claims and consists essentially in the provision of a process for heating an adhesive composition by an electrical, magnetic or electromagnetic alternating field, the adhesive composition containing nanoscale particles with ferromagnetic, ferrimagnetic, superparamagnetic or piezoelectric properties so that, on exposure to the radiation, the adhesive composition is heated to such an extent that, in the case of thermoplastic adhesives, the softening point of the thermoplastic binder is reached or exceeded and, in the case of reactive adhesives, a temperature at which the binder matrix is crosslinked via the reactive groups of the binder is reached.

DETAILED DESCRIPTION OF THE INVENTION

The present invention also relates to a process for bonding nonmetallic materials and/or composite materials which comprises the following key steps:
applying the adhesive composition containing nanoscale particles with ferromagnetic, ferrimagnetic, superparamagnetic or piezoelectric properties to at least one of the substrate surfaces to be joined, optionally after cleaning and/or surface treatment
fitting the substrates together
curing the bond by heating with electromagnetic radiation.

The present invention also relates to a similar process for joining metallic materials and/or composite materials comprising the following key steps:
applying the adhesive composition containing nanoscale particles with ferromagnetic, ferrimagnetic, superparamagnetic or piezoelectric properties to at least one of the substrate surfaces to be joined, optionally after cleaning and/or surface treatment
heating the adhesive composition by electromagnetic radiation
fitting the substrates together.

The processes for bonding materials may also take place in two stages. In a first stage, the adhesive matrix is only partly cured by thermal precuring or by UV radiation and, in a following process step, is fully cured by the electromagnetic radiation. On the other hand, this two-stage process may also be carried out in such a way that, in the first stage, the adhesive matrix is only partly cured by electromagnetic radiation and, in a following process step, is fully cured by heat curing, moisture curing or UV radiation.

Nanoscale particles in the context of the present invention are particles with a mean particle size (or a mean particle diameter) of no more than 500 nm, more preferably of no more than 200 nm, most preferably of 100 nm or smaller and, in one most particularly preferred embodiment, of no more than 50 nm. Particle size in the context of this definition means primary particle size. The nanoscale particles to be used in a particularly preferred embodiment of the invention have a mean particle size of 1 to 100 nm and more preferably of 3 to 50 nm. In order particularly effectively to utilize the effects through superparamagnetism, the particle sizes should be no more than 50 nm. The particle size is preferably determined by the UPA (ultrafine particle analyzer) method, for example by laser light back scattering. In order to prevent or avoid agglomeration or coalescence of the nanoscale particles, the particles are normally surface-modified or surface-coated. A corresponding process for the production of agglomerate-free nanoscale particles, for example iron oxide particles, is described in columns 8 to 10 of DE-A-196 14 136. Methods for the surface coating of such nanoscale particles for avoiding agglomeration thereof are disclosed in DE-A-197 26 282.

Electrical alternating fields or magnetic alternating fields are suitable for the introduction of energy. Where electrical alternating fields are applied, suitable filler materials are any piezoelectric compounds, for example quartz, tourmaline, barium titanate, lithium sulfate, potassium tartrate, sodium tartrate, potassium sodium tartrate, ethylenediamine tartrate, ferroelectric materials of perovskite structure and, above all, lead zirconium titanate. Where magnetic alternating fields are used, any ferrimagnetic, ferromagnetic or superparamagnetic materials are basically suitable, more particularly the metals aluminium, cobalt, iron, nickel or alloys thereof and metal oxides of the n-maghemite type ($\gamma$-$Fe_2O_3$) and the n-magnetite type ($Fe_3O_4$), ferrites with the general formula $MeFe_2O_4$, where Me stands for divalent metals from the group consisting of manganese, copper, zinc, cobalt, nickel, magnesium, calcium or cadmium.

Where magnetic alternating fields are used, nanoscale superparamagnetic particles, so-called single domain particles, are particularly suitable. Compared with the paramagnetic particles known from the prior art, the nanoscale fillers are distinguished by the fact that they have no hysteresis. The result of this is that the dissipation of energy is not produced by magnetic hysteresis losses, instead the generation of heat is attributable to an oscillation or rotation of the particles in the surrounding matrix induced during the action of an electromagnetic alternating field and, hence, ultimately to mechanical friction losses. This leads to a particularly effective heating rate of the particles and the matrix surrounding them.

The process according to the invention is distinguished from the conventional methods of heating in particular by the fact that, through the locally confined generation of heat, the substrate materials to be bonded are not subjected to any heat stress. The process is very quick and effective because it does not involve the diffusion of heat through the substrates. Even occasionally considerable heat losses are avoided in this way, so that the process according to the invention is particularly economical.

In cases where the above-described effects for curing adhesives have to be carried out particularly inexpensively, it has proved to be of useful to employ the ferromagnetic iron oxides and mixed oxides that were originally developed for electromagnetic storage media, such as magnetic tapes and disks, because they can be inexpensively produced on a large scale and are correspondingly available. These metal oxides normally have particle diameters of 200 nm to 1,000 nm and may also be used in accordance with the invention.

Suitable matrixes for the adhesives to be used in accordance with the invention are, in principle, any polymers suitable for adhesives. Examples of thermoplastically softenable adhesives are hotmelt adhesives based on ethylene/vinyl acetate copolymers, polybutenes, styrene/isoprene/styrene and styrene/butadiene/styrene copolymers, thermoplastic elastomers, amorphous polyolefins, linear thermoplastic polyurethanes, copolyesters, polyamide resins, polyamide/EVA copolymers, polyaminoamides based on dimer fatty acids, polyester amides or polyether amides. Other suitable adhesives are, in principle, the known two-pack adhesives based on one- or two-component polyurethanes, one- or two-component polyepoxides, silicone polymers (one or two components), the silane-modified polymers described, for example, in G. Habenicht, "Kleben: Grundlagen, Technologie, Anwendungen", 3rd Edition, 1997, Chapter 2.3.4.4. The (meth)acrylate-functional two-pack adhesives based on peroxidic hardeners, anaerobic curing mechanisms, aerobic curing mechanisms or UV curing mechanisms are also suitable as the adhesive matrix.

Binders based on the one- or two-component reactive rubbers disclosed, for example, in EP-A-356 715, DE-A-19502381, DE-A-19518673 or DE-A-19730425 are also suitable. This process may also be used for the curing of adhesives/sealants or sealing compounds based on PVC homopolymers or copolymers, (meth)acrylate homo- or copolymers or styrene copolymers and plasticizers. If the adhesives are to be cured effectively and quickly at particularly low temperatures, it is also possible in particular to use the one-component polyurethane systems which contain as reactive partners liquid or readily fusible polyols or amino-terminated prepolymers in which solid surface-deactivated polyisocyanates are dispersed. Such surface-deactivated polyisocyanate systems are disclosed, for example, in EP-A-922720, U.S. Pat. No. 5,710,215, EP-A-598873, EP-A-671423, EP-A-417540, EP-A-510476, EP-A-212511 or EP-A-131903.

Among the last of the binders mentioned above, dispersions based on solid derivatives of toluene diisocyanate (TDI) such as, for example, TDI uret dione or TDI urea powder or trimers of isophorone diisocyanate (IPDI) are particularly suitable. Such surface-deactivated polyisocyanates are powders and have melting points of 95 to 145° C. and particle sizes of about 1 µm to about 30 µm, the 50% mean values of the particle size distribution being 8 µm or 2 µm. The advantage of these micronized solid diisocyanates is that they are substantially insoluble at low temperatures in hydrocarbons, many polyols and plasticizers so that they can be dispersed therein and can be surface-deactivated with suitable amines.

Preferred dispersants are polyols which are polyhydroxy compounds that are liquid, glass-like and amorphous or crystalline at room temperature and which have two or three hydroxyl groups per molecule and molecular weights in the range from 400 to 20,000 and preferably in the range from 1,000 to 6,000. Examples are difunctional and/or trifunctional polypropylene glycols, although statistical and/or block copolymers of ethylene oxide and propylene oxide may also be used. Another group of preferred polyethers are the polytetramethylene glycols (poly(oxytetramethylene)glycol, poly-THF) which are produced, for example, by acidic polymerization of tetrahydrofuran, the molecular weights of the polytetramethylene glycols being in the range from 600 to 6,000 and preferably in the range from 800 to 5,000.

Other suitable polyols are the liquid, glass-like amorphous or crystalline polyesters which may be obtained by condensation of dicarboxylic or tricarboxylic acids such as, for example, adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimer fatty acid or mixtures thereof with low molecular weight diols or triols such as, for example, ethylene glycol, propylene glycol, diethylene glycol, triethylene glycol, dipropylene glycol, butane-1,4-diol, hexane-1,6-diol, decane-1,10-diol, dodecane-1,12-diol, dimer fatty alcohol, glycerol, trimethylol propane or mixtures thereof. Another group of polyols suitable for use in accordance with the invention are the polyesters based on ε-caprolactone which are also known as "polycaprolactones". However, polyester polyols of oleochemical origin may also be used. Oleochemical polyester polyols may be obtained, for example, by complete ring opening of epoxidized triglycerides of a fatty mixture containing at least partly olefinically unsaturated fatty acids with one or more alcohols containing 1 to 12 carbon atoms and subsequent partial transesterification of the triglyceride derivatives to form alkyl ester polyols with 1 to 12 carbon atoms in the alkyl group. Other suitable polyols are polycarbonate polyols and dimer diols (Henkel KGaA) and also castor oil and its derivatives. The hydroxyfunctional polybutadienes known, for example, by the commercial name of "Poly-bd" may also be used as polyols for the compositions according to the invention.

Other suitable polyols are linear and/or lightly branched acrylate copolymer polyols which may be produced, for example, by the radical copolymerization of acrylates or methacrylates with hydroxyfunctional acrylic acid and/or methacrylic acid compounds, such as hydroxyethyl (meth) acrylate or hydroxypropyl (meth)acrylate. In view of this method of production, the hydroxyl groups in these polyols are generally statistically distributed so that the polyols are either linear or lightly branched polyols with an average OH functionality. Although the difunctional compounds are preferred for the polyols, polyols of higher functionality may also be used, at least in small quantities. The solid polyols should have a melting range below 70° C. and preferably below 50° C. and should have a low viscosity in the molten state although polyols that are liquid at room temperature are particularly preferred.

A number of triamines or polyamines may be used instead of or together with the polyols mentioned above although aminoterminated polyalkylene glycols are preferred, more particularly the trifunctional aminoterminated polypropylene glycols, polyethylene glycols or copolymers of propylene glycol and ethylene glycol. These are also known by the name of "Jeffamine" (a trade name of the Huntsman company). The trifunctional aminoterminated polyoxytetramethylene glycols (also known as poly-THF) are also particularly suitable, as are aminoterminated polybutadienes and aminobenzoic acid esters of polypropylene glycols, polyethylene glycols or poly-THF (known by the trade name of "Versalink Oligomeric Diamines" of Air Products). The aminoterminated polyalkylene glycols or polybutadienes have molecular weights of 400 to 6,000.

In principle, any relatively high-frequency electromagnetic alternating field may be used as the energy source for heating the adhesives containing nanoscale particles. For example, electromagnetic radiation of the so-called ISM (industrial, scientific and medical applications) ranges may be used, cf. inter alia Kirk-Othmer, "Encyclopedia of Chemical Technology", 3rd Edition, Vol. 15, chapter entitled "Microwave technology", for further particulars.

It was pointed out in the foregoing that, where nanoscale particles according to the invention are used, electromagnetic radiation may be used to particular effect. This is clearly reflected in the fact that, even in the low-frequency range of about 50 kHz or 100 kHz up to 100 MHz, virtually any frequency can be used to produce the amount of heat needed to split the adhesive bond matrix in the adhesive matrix. The choice of the frequency may be determined by the equipment available, care naturally having to be taken to ensure that interference fields are not radiated.

The invention is illustrated in the following by a few basic tests. The choice of the Examples is not intended to limit the scope of the invention in any way, the Examples merely serving as models to illustrate the mode of operation of the adhesive compositions according to the invention.

EXAMPLES

The tests to determine the effect of the nanoscale particles on thermal adhesives were based on three thermoplastic hotmelt adhesives obtainable from Henkel KGaA. The hotmelt adhesives in question were a normal ethylene/vinyl acetate-based adhesive (Technomelt Q 3118, EVA 1) and two polyamide-based adhesives of medium heat resistance (Macromelt 6208, PA1) and high heat resistance (modified polyamide PA2). A selection of characteristic adhesive or material properties of the unmodified adhesives is set out in Table 1.

TABLE 1

| Example | Adhesive | HR [° C.] | TSS (wood/wood) [MPa] | TSS (PVC/PVC) [MPa] |
|---|---|---|---|---|
| 1 | EVA 1 | 53 | 2.40 | 2.25 |
| 2 | PA1 | 124 | 2.92 | 3.41 |
| 3 | PA2 | 153 | 6.67 | 3.86 |

To determine the heat resistance (HR) of the bonds, two holed test specimens of beechwood and PVC measuring 100×25×4 mm were bonded with the adhesive over an area of 20×25 mm and were then stored for about 24 h at room temperature. The bonded test specimens were then hung up in a recirculating air drying cabinet (Heraeus UT 5050 EK) and a weight of 1365 g was attached. The following temperature program was then applied:
1. start at 25° C.,
2. heat from 25° C. to 50° C. in 10 mins,
3. heat from 50° C. to 200° C. over 5 h,
4. keep at 200° C. for 20 mins. and
5. cool to 25° C. in 20 mins.

The time in seconds to bond failure was indicated by means of a microprogrammer (DEP 1131). Heat resistance (HR) was calculated on the basis of the following equation:

$$HR[°C.]=[((\text{time measured in secs})-600)/120]+50.$$

Tensile shear strength (SS) was determined to DIN 53283. Test specimens of beechwood and PVC measuring 100× 25=4 mm were bonded with the adhesives over an area of 20×25 mm and, after about 24 hours, were tensile-tested (Zwick 144501 Universal Tester).

The adhesives described above were modified with various amounts of nanoscale magnetite. The magnetite used was partly surface-modified for better adaptation to the polymeric adhesive matrix. The particle sizes shown in Table 2 were determined by UPA (ultrafine particle analyzer) measurements. The crystallite sizes of the magnetites were determined by X-ray structure analysis as 8 nm.

TABLE 2

| Name | Modification | Mean particle size |
|---|---|---|
| MA | None | 50 nm |
| MA-MPTS | Methacryl groups | 50 nm |
| MA-AEA | Epoxide groups | 50 nm |

The magnetites listed in Table 2 were dispersed in various filling levels in the adhesives described in Table 1. The properties of a few selected 20% by weight modified formulations are set out in Table 3.

TABLE 3

| Example | Adhesive/filler | HR [° C.] | TSS (wood/wood) [MPa] | TSS (PVC/PVC) [MPa] |
|---|---|---|---|---|
| 4 | EVA 1 + 20% MA | 51 | 3.55 | 2.98 |
| 5 | PA1 + 20% MA-MPTS | 132 | 3.33 | 3.53 |
| 6 | PA2 + 20% MA | 169 | 4.88 | 2.29 |
| 7 | PA2 + 20% MA-MPTS | 169 | 3.86 | 2.51 |
| 8 | PA2 + 20% MA-AEA | 169 | 4.37 | 1.74 |

It is clear from Examples 4 to 8 that, even where the adhesive is highly filled with nanoscale magnetite, heat resistance and shear strength are generally not adversely affected. In the case of the highly heat-resistant polyamide-based adhesive (PA 2), the quantity of magnetite particles and the surface modifier have to be adapted to one another and to the substrate to be bonded if very high tensile shear strengths are to be obtained.

Example 9

Influence of the "Signal Receiver" Particle Size on the Inductive Heatability of Modified Adhesives:

Basically, not only nanoscale "signal receivers", but also those with a larger particle size are suitable for the inductive heating of polymer matrixes. However, as a result of another heating mechanism which will not be described in any more detail here, the amount of energy which can be introduced where nanoscale particles are used is considerably greater than where larger particles are used. This can be illustrated by corresponding tests carried out by way of example with a modified polyester system (Dynacoll 7360, Hüls). The magnetic alternating field required was generated with a Hüttinger TIG 5/300 generator. The voltage applied was 180 V. The coil used had a diameter of 3.5 cm and 10 turns. It was part of the oscillation-producing oscillator circuit. With the voltages and dimensions mentioned, a frequency of about 250 KHz was obtained. It is clear from Example 10 and the Comparison Example that, where nanoscale fillers are used in accordance with the invention as "signal receivers" in the adhesive matrix, the modified polyester is heated to far higher temperatures in a far shorter time than where the "coarser" magnetite particles are used. The results of the tests are set out in Table 4.

TABLE 4

| Time [secs] | Example 10 Nano-magnetite Temperature [° C.] | Comparison Sub-µ-magnetite Temperature [° C.] |
| --- | --- | --- |
| 0 | 20.4 | 18 |
| 5 | 25.9 | 20.3 |
| 10 | 34.7 | 24.1 |
| 15 | 41.2 | 27.5 |
| 20 | 46 | 30.9 |
| 25 | 48.1 | 35.1 |
| 30 | 49.9 | 38.3 |
| 35 | 50.7 | 41.1 |
| 40 | 52.4 | 43.4 |
| 45 | 62.6 | 45.2 |
| 50 | 75.1 | 46.9 |
| 55 | 85 | 47.9 |
| 60 | 93.5 | 48.7 |
| 70 | 108 | 50.5 |
| 80 | 118 | 52.4 |
| 90 | 124.9 | 66.2 |
| 100 | | 82 |

Example 10

Influence of the "Signal Receiver" Filling Level on the Inductive Heatability of Modified Adhesives The heating-up behavior of modified adhesives in the magnetic alternating field is highly dependent on the filling level of the signal receiver used. Corresponding tests were carried out by way of example with magnetite-modified EVAL. The magnetic alternating field required was generated with a Hüttinger TIG 5/300 generator. The voltage applied was 180 V. The coil used had a diameter of 3.5 cm and 10 turns. The results of the tests are set out in Table 5.

TABLE 5

| Example | n-Magnetite filling level [%] | Time to reach melting point (80° C.) [s] |
| --- | --- | --- |
| 11 | 5 | 89 |
| 12 | 10 | 42 |
| 13 | 15 | 27 |
| 14 | 20 | 20 |

It is clear from Examples 11 to 14 that, as the nanoscale magnetite filling level increases, the necessary heating-up time is drastically reduced for otherwise the same conditions.

Example 15

Influence of the Strength of the Magnetic Alternating Field on the Inductive Heatability of Modified Adhesives A critical factor in the inductive heating of magnetite-modified adhesives is the strength of the magnetic field applied. The resulting strength of the field in the coil is dependent inter alia on the voltage applied or the flowing current. Tests to determine the effect of different voltages were carried out with a Hüttinger TIG 5/300 generator. The maximum voltage applied was 180 V. The coil used had a diameter of 3.5 cm and 10 turns. The composition of Example 8 was used as the adhesive. The results are set out in Table 6.

TABLE 6

| Time [s] | Heating temperature [° C.] at U = [V] | | | | | | | | | |
| --- | --- | --- | --- | --- | --- | --- | --- | --- | --- | --- |
| | 18 V | 36 V | 54 V | 72 V | 90 V | 108 V | 126 V | 144 V | 162 V | 180 V |
| 0 | 23.8 | 23.3 | 24.1 | 24.7 | 24 | 22.7 | 25.1 | 25.7 | 21.6 | 22.3 |
| 20 | 23.9 | 23.3 | 26.6 | 29 | 35.1 | 36.5 | 47 | 54.7 | 52.5 | 65 |
| 40 | 23.7 | 24 | 29.6 | 34.5 | 45 | 50.2 | 64.6 | 79.3 | 78.5 | 98.7 |
| 60 | 24.1 | 24.9 | 32.7 | 39.1 | 53.3 | 61 | 80.6 | 98.5 | 99.8 | 121 |
| 80 | 24.8 | 25.7 | 35.1 | 44.4 | 60.3 | 71 | 95 | 114 | 118.1 | 140.6 |
| 100 | 24.6 | 26.3 | 37.6 | 48.8 | 68.5 | 81 | 106 | 126 | 134.6 | 155.5 |
| 120 | 25.3 | 26.5 | 39.9 | 52.2 | 75 | 88 | 116 | 140 | | 170 |
| 140 | 25.1 | 27.4 | 42.1 | 56 | 80.5 | 97 | 125 | 148 | | 178 |

TABLE 6-continued

| Time | Heating temperature [° C.] at U = [V] | | | | | | | | |
|---|---|---|---|---|---|---|---|---|---|
| [s] | 18 V | 36 V | 54 V | 72 V | 90 V | 108 V | 126 V | 144 V | 162 V | 180 V |
| 160 | 25.8 | 28 | 44.4 | 58.8 | 85.6 | 102.8 | 133.6 | 155 | | 191 |
| 180 | 25.7 | 28.1 | 46 | 62 | 91 | 109 | 140 | 159 | | 198 |

It is clear from the figures in Table 6 that the heating rate of the adhesive matrix increases considerably with increasing field strength (i.e. with increasing voltage applied) so that temperatures sufficient to be able to melt the adhesive matrix and thus to fit together and bond two substrates are reached in a very short time.

Example 16

Influence of Coil Geometry on the Inductive Heatability of Modified Adhesives:

The field strength of the magnetic alternating field is dependent not only on the voltage applied, but also on the length and number of turns of the coil used. For a constant voltage, a field of different frequency or strength is obtained according to the length of the coil and the number of turns. Corresponding tests were carried out at a constant maximum voltage of 180 V. PA 2 modified with 20% by weight magnetite was used as the adhesive base. The coils used had a constant diameter of 3.5 cm and differed in the number of turns. The results of these tests are set out in Table 7.

TABLE 7

| t [s] | T[° C.] 10 Turn-coil | T[° C.] 4-Turn coil |
|---|---|---|
| 0 | 22.3 | 21.2 |
| 10 | | 95 |
| 20 | 65 | 137 |
| 30 | | 162 |
| 40 | 99 | 179 |
| 50 | | 198 |
| 60 | 121 | 215 |
| 70 | | 226 |
| 80 | 140 | |
| 100 | 155 | |
| 120 | 170 | |
| 140 | 178 | |
| 160 | 191 | |
| 180 | 198 | |
| 200 | — | |
| 220 | | |
| 240 | | |

The results set out in Table 7 show that, with a shorter coil length or smaller number of turns and the resulting greater field strength, the heating rate increases significantly for the same adhesive composition.

To determine to what extent inductive heating leads to a change in the properties of the adhesive, tests were carried out in which a PA 2 modified with 20% by weight magnetite was inductively heated several times. A Hüttinger TIG 5/300 generator was used for the tests. The voltage applied was 180 V. The coil used had a diameter of 3.5 cm and 10 turns. The results obtained show that, even after repeated heating in a magnetic alternating field, the heating-up behavior of the modified adhesive remains virtually unaffected.

With thermoplastic adhesives, therefore, heating and hence the bonding of the substrates can be made reversible so that the bonded parts can be repeatedly separated and fitted back together if necessary.

For curing a one-component reactive adhesive, a one-component heat-curing polyurethane adhesive (Terolan 1500, a product of Henkel Teroson GmbH) was used. This adhesive is a polyurethane adhesive based on polyols, Jeffamines, catalysts and a surface-deactivated TDI dimer dispersed therein. In the following Examples, the unmodified adhesive was called "TcPU". This adhesive was modified with various qualities of nanoscale n-magnetite. Wood-to-wood adhesive bonds of correspondingly modified adhesive were exposed to a magnetic alternating field. It was found that the cure rate depends to a very large extent on the frequency and field strength of the magnetic field used and on the thickness of the adhesive layer. A Hüttinger TIG 5/300 field generator was used. The voltage applied was 100% of the maximum value possible with the generator used (180 V). A coil with 10 turns was used for the "weak" magnetic field and one with 4 turns for the "strong" magnetic field. A selection of the results is shown in Tables 8–10. The thickness of the adhesive was 500 μm throughout.

TABLE 8 curing in a "weak" magnetic alternating field

| Example | Adhesive | Cure time [mins:secs] | TSS [N/mm$^2$] |
|---|---|---|---|
| 15 | TcPU + 10% by weight n-magnetite | 2:30 | 3.95 |
| 16 | TcPU + 10% by weight n-magnetite | 5:00 | 4.59 |
| 17 | TcPU + 10% by weight n-magnetite | 12:00 | 5.64 |

TABLE 9 curing in a "strong" magnetic alternating field

| Example | Adhesive | Cure time [mins:secs] | TSS [N/mm$^2$] |
|---|---|---|---|
| 18 | TcPU + 5% by weight n-magnetite | 0:40 | 2.20 |
| 19 | TcPU + 5% by weight n-magnetite | 1:00 | 4.04 |
| 20 | TcPU + 5% by weight n-magnetite | 1:20 | 4.68 |

TABLE 10 comparison experiment: oven curing at 100° C.

| Adhesive | Cure time [mins:secs] | TSS [N/mm$^2$] |
|---|---|---|
| TcPU + 10% by weight magnetite | 30:00 | 4.75 |

It is clear from Examples 15 to 20 that, even with very small quantities of magnetite, a heat-curing reactive adhesive of the type in question can be cured in a very short time to give very high tensile shear strengths far exceeding the tensile shear strengths obtained with conventional oven curing of the same adhesive composition. More particularly, it is clear from these tests that the cure time of the adhesive can be drastically reduced in the process according to the invention of curing with electromagnetic radiation. The thermal stressing of the substrates to be bonded is thus also reduced.

What is claimed is:

1. A process for curing a thermoplastic or reactive adhesive composition containing a binder and nanoscale particles having superparamagnetic or piezoelectric properties, comprising applying to the adhesive composition an electrical, magnetic or electromagnetic alternating field to effect heating of the composition wherein:
   in the case of thermoplastic adhesives, the adhesive composition is heated beyond the softening point of the thermoplastic binder, or
   in the case of reactive adhesives, the adhesive composition is heated to a temperature at which the binder matrix is crosslinked via the reactive groups of the binder; wherein the nanoscale particles have a mean particle size of 3 to 50 nm and the electrical, magnetic or electromagnetic alternating field has a frequency of between 50 kHz and 300 MHz.

2. The process of claim 1 wherein the nanoscale particles consist of piezoelectric materials selected from the group consisting of quartz, tourmaline, barium titanate, lithium sulfate, potassium tartrate, sodium tartrate, potassium sodium tartrate, ethylenediamine tartrate, ferroelectric materials of perovskite structure and lead zirconium titanate.

3. The process of claim 1 wherein the nanoscale particles of superparamagnetic materials are selected from the group consisting of aluminium, cobalt, iron, nickel or alloys thereof, metal oxides of the n-maghemite type ($y$-$Fe_2O_3$) and the n-magnetite type ($Fe_3O_4$) or ferrites with the general formula $MeFe_2O_4$, where Me stands for a divalent metal selected from manganese, copper, zinc, cobalt, nickel, magnesium, calcium or cadmium.

4. The process of claim 1 wherein the nanoscale particles are present in a quantity of 1 to 30% by weight based on the adhesive composition.

5. The process of claim 1 wherein the thermoplastic adhesive composition is selected from the group consisting of ethylene/vinyl acetate copolymers, polybutenes, styrene/isoprene/styrene or styrene/butadiene/styrene copolymers, thermoplastic elastomers, amorphous polyolefins, linear thermoplastic polyurethanes, copolyesters, polyamide resins, polyamide/EVA copolymers, polyaminoamides based on dimer fatty acids, polyester amides, polyether amides or plastisols based on PVC homopolymers and/or copolymers, (meth)acrylate homo- and/or copolymers and styrene copolymers and plasticizers.

6. The process of claim 1 wherein the reactive adhesive composition is selected from the group consisting of one- or two-component polyurethanes, one- or two-component polyepoxides, silicone polymers, silane-modified polymers, one or two-component reactive rubbers and one-component polyurethanes with surface-deactivated, solid polyisocyanates.

7. A process for bonding substrates selected from the group consisting of non-metallic materials and composite materials comprising the steps of:
   applying an adhesive composition containing nanoscale particles having superparamagnetic or piezoelectric properties to at least one of the substrate surfaces to be joined, optionally after cleaning and/or applying a surface treatment,
   fitting the substrates together, and
   curing the adhesive composition by heating with electromagnetic radiation according to the process of claim 1.

8. The process of claim 7 further comprising partially curing the adhesive composition prior to the application of electromagnetic radiation by applying thermal precuring or UV radiation.

9. The process of claim 7 further comprising a final step of applying heat curing, moisture curing or UV radiation.

10. A process for joining substrates selected from the group consisting of metallic materials and composite materials comprising the steps of:
    applying an adhesive composition containing nanoscale particles having superparamagnetic or piezoelectric properties to at least one of the substrate surfaces to be joined, optionally after cleaning and/or applying a surface treatment,
    heating the adhesive composition by electromagnetic radiation according to the process of claim 1, and
    fitting the substrates together.

11. The process of claim 10 further comprising partially curing the adhesive composition prior to the application of electromagnetic radiation by applying thermal precuring or UV radiation.

12. The process of claim 10 further comprising a final step of applying heat curing, moisture curing or UV radiation.

13. The process of claim 1 wherein the electrical, magnetic or electromagnetic alternating field has a frequency of 50 kHz–100 MHz.

14. The process of claim 1 wherein the electrical, magnetic or electromagnetic alternating field has a frequency of between 100 kHz–100 MHz.

15. The process of claim 1 wherein the electrical, magnetic or electromagnetic alternating field has a frequency of 500 kHz to 50 MHz.

* * * * *